Sept. 20, 1932.  E. A. JOHNSTON  1,878,855
TRACTOR
Filed June 17, 1929    4 Sheets-Sheet 1

Inventor.
Edward A. Johnston,
By
Atty.

Sept. 20, 1932.  E. A. JOHNSTON  1,878,855
TRACTOR
Filed June 17, 1929    4 Sheets-Sheet 2
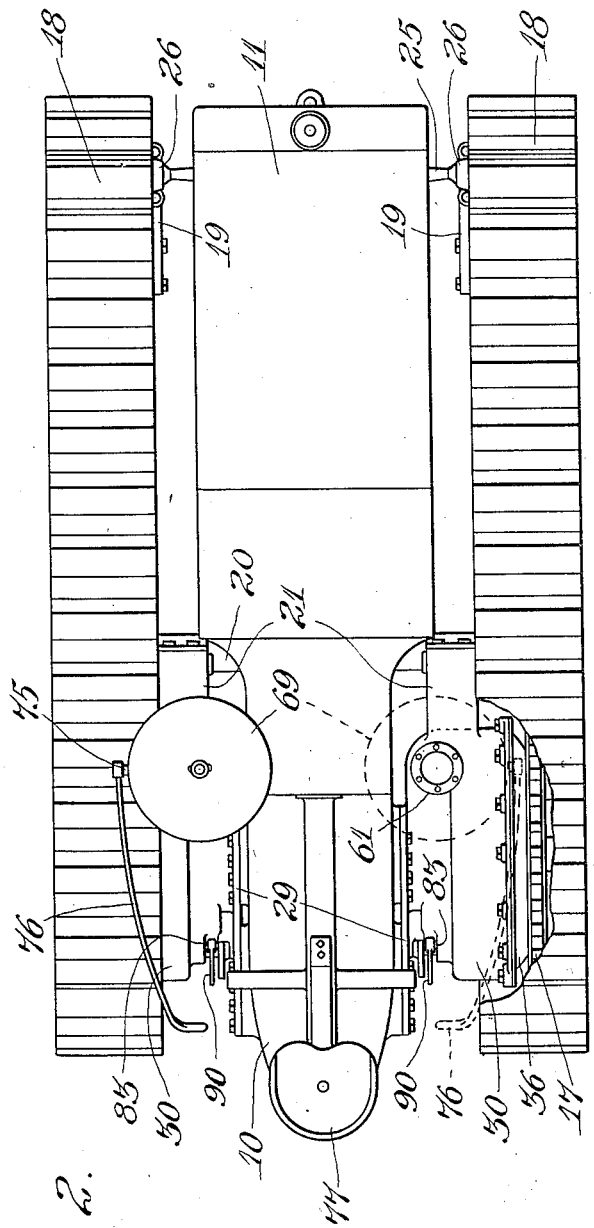
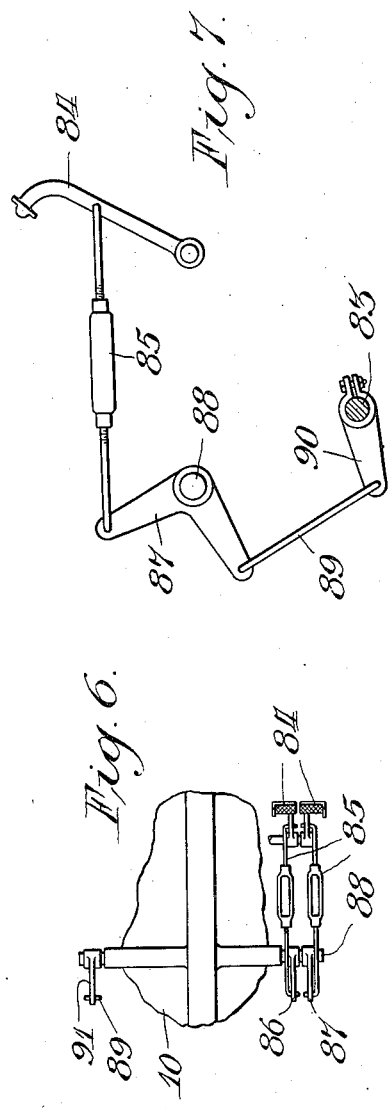
Inventor.
Edward A. Johnston,
By
Atty.

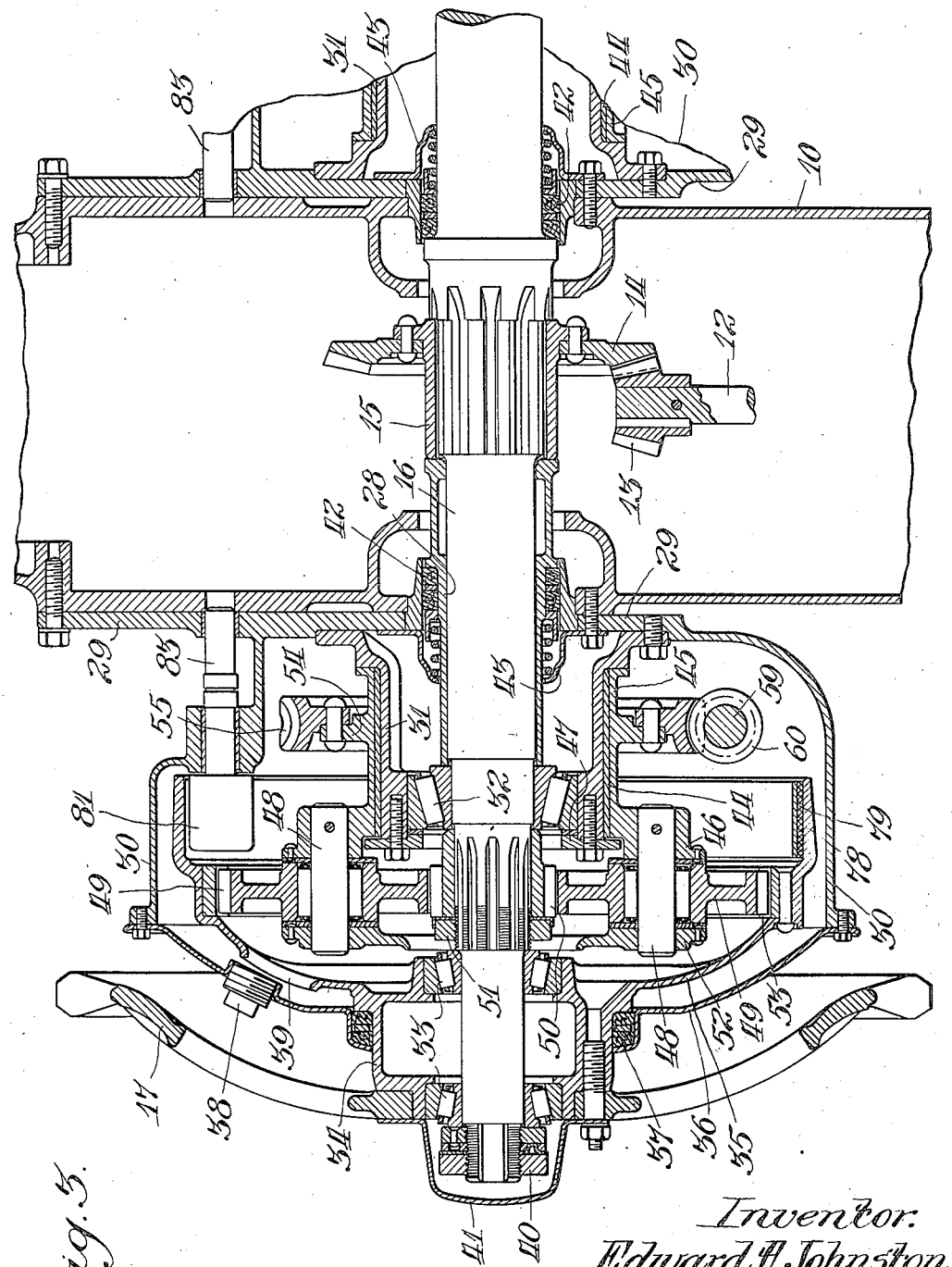

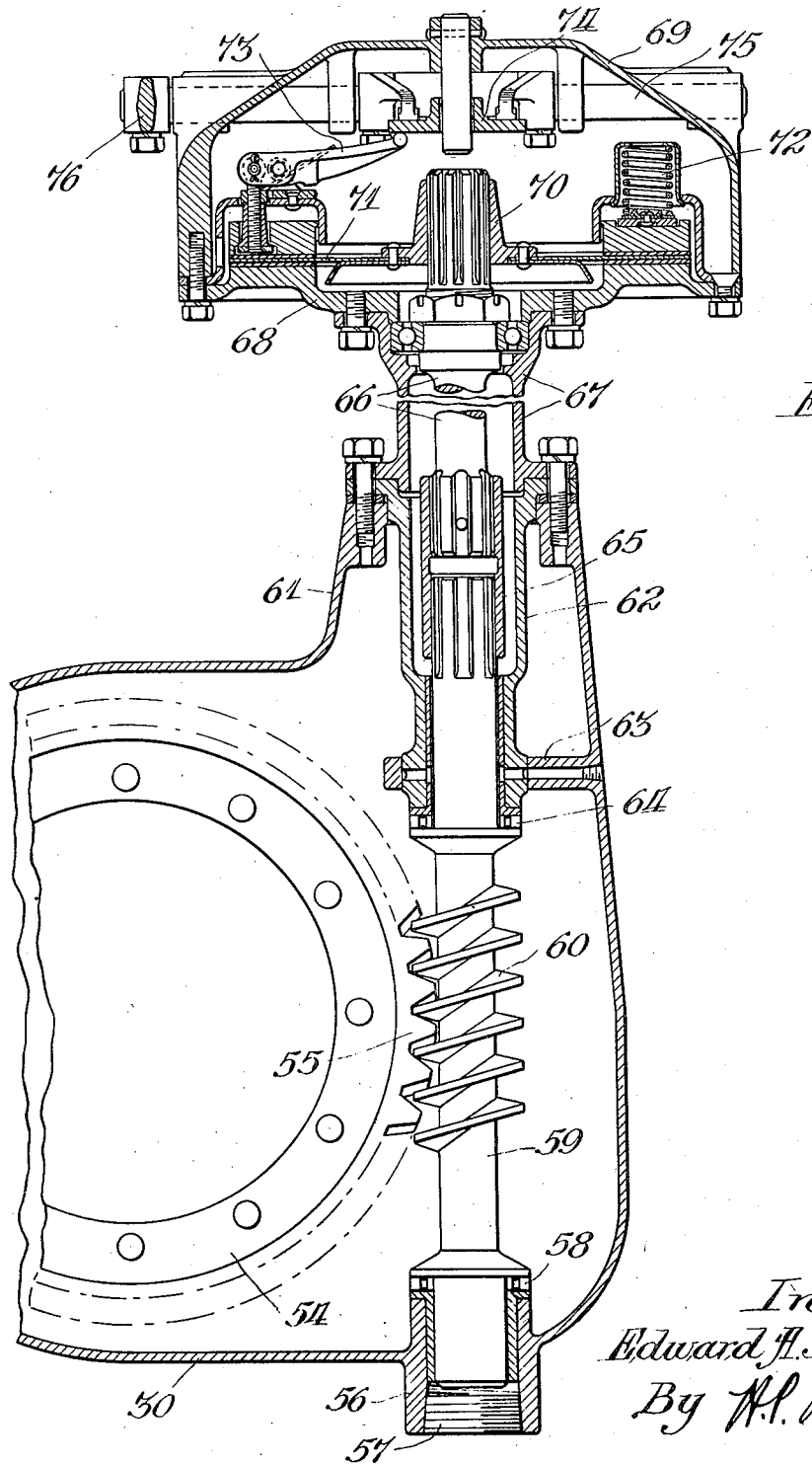

Patented Sept. 20, 1932

1,878,855

UNITED STATES PATENT OFFICE

EDWARD A. JOHNSTON, OF CHICAGO, ILLINOIS, ASSIGNOR TO INTERNATIONAL HARVESTER COMPANY, A CORPORATION OF NEW JERSEY

TRACTOR

Application filed June 17, 1929. Serial No. 371,669.

This invention relates to tractors of the tracklayer type. Particularly the invention relates to an improved steering by driving control for such a tractor.

The primary object of the invention is to provide an improved transmission, and steering by driving control for a tractor.

Another object is to provide mechanism of the kind stated which is compact in arrangement, can be assembled and disassembled in an easy and orderly manner, and lastly, will be dirt and dust proof and capable of easy lubrication.

Other objects will be apparent to those skilled in the art as the disclosure continues.

The tractor comprises the usual body supported by a three-point suspension on a front equalizer bar, and on the usual two, side arranged, tracklayer units. These tracklayer units are driven from rear sprocket wheels rotatable on the end of a solid axle which is driven from shafting from a sliding gear transmission moved by the power plant. The tractor body, at its sides, carries stationary casings around the axle ends, in which casings is located the improved driving and control mechanism comprising planetary gearing, a brake, and a clutch controlled means for locking the planet carrier to regulate the drive to the main driving sprockets for the tracks, the sprockets being arranged exterior of the stationary casings mentioned. So much will suffice to give a general idea of the structure presently to be described in detail.

A practicable embodiment of the invention is disclosed in the accompanying sheets of drawings, in which,—

Figure 2 is a general plan view thereof;

Figure 3 is a horizontal, sectional view through the rear axle and the driving and steering control means for one of the tracklayer units;

Figure 4 is a vertical, transverse sectional view through one of the steering controls;

Figure 6 is a plan view detail of the brake controls; and,

Figure 7 is a side view of the brake controls.

The body of the tractor may comprise a longitudinally extending, narrow, integral main frame 10 carrying at its front end the power plant 11, and rearwardly thereof in a conventional manner, the sliding gear transmission (not shown) which drives the main shaft 12 (see Figure 3).

Figure 1:
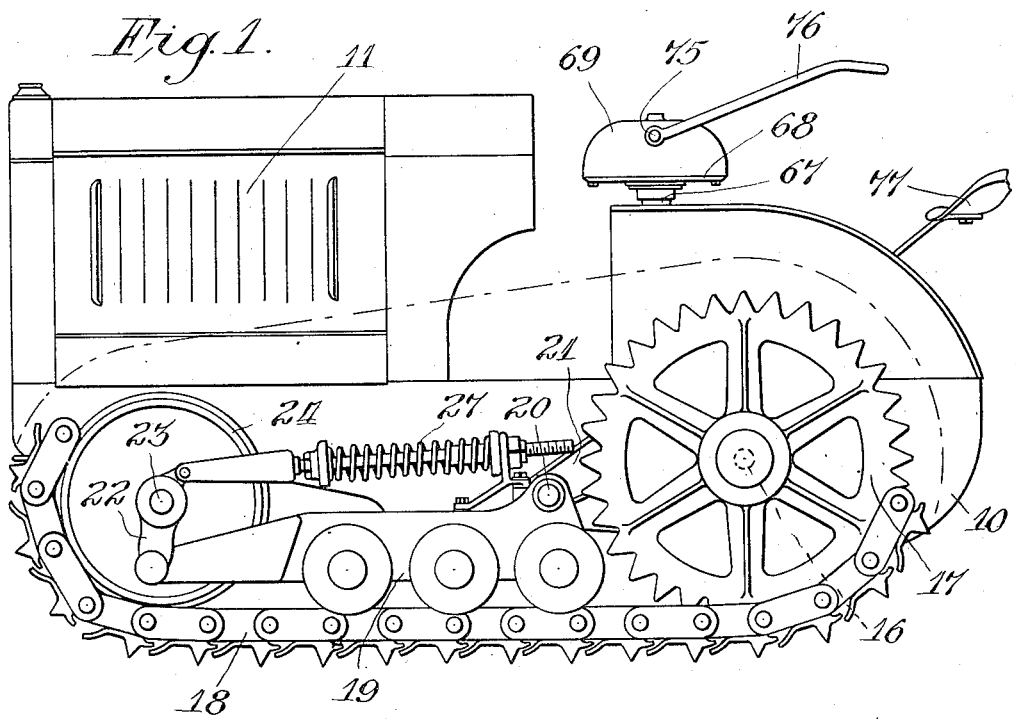
Figure 1 is a general side elevational view of the tractor.

The rear end of this main shaft has made fast thereto, a bevel pinion 13 in mesh with a bevel gear ring 14 riveted to the flange of a hub or sleeve 15 that is splined centrally to a solid, continuous shaft 16, which comprises the rear axle of the tractor passing through the frame 10, as shown in Figure 3. The ends of the axle loosely carry driving sprocket wheels 17, around which are trained the endless, tracklayer chains 18. See also Figures 1 and 2. The specific mounting of these drive sprocket wheels will be gone into later. Each tracklayer 18 carries on its lower run the roller side frames 19 which are pivoted at their rear ends to a bar 20 carried in side brackets 21 rigidly secured in any approved manner to the sides of the main frame 10. The forward ends of these side frames carry brackets 22 for mounting pins 23 upon which are journaled the front idler sprocket wheels 24, around which the forward ends of the tracklayer chains are trained. It will be understood that, due to the pivotal mounting of each roller side frame, the tracklayer units are permitted an independent up and down movement, as is customary in tractors of this type. An equalizer bar 25 having ball and socket connections 26 with the inner front ends of the roller side frames is also provided and forms a central, front support for the main frame 10. Adjustable cushion spring devices 27 may be provided to take up severe shocks to which the tracklayers are subjected in use.

Steering of these tractors is usually effected by a clutch that holds one side locked and permitting a continuance of the opposite side drive to cause turning. These clutches in the past were under load causing wear and necessitating frequent replacement of parts.

Additionally, replacement was awkward because of the location of these clutches. In the present invention the clutch control to regulate steering by driving is remote from the track driving mechanism and out where it is accessible. Further, the clutch is never under load. Therefore, it will last longer in use. This permits use of a smaller clutch, which is, of course, desirable. This improved track driving and steering mechanism will now be described.

Referring to Figure 3, it will be seen that the solid axle 16 is passed laterally through openings in the main frame 10. A spacer 28 is provided to hold the bevel gear 14 against the end of the splines shown. The same driving means appears on both ends of the axle, with the exception of the spacer 28, which occurs only on one side, and, therefore, only one side is being described and illustrated.

Each side of the frame 10 has removably bolted thereto a plate or bracket 29 formed with a laterally projecting bell forming a stationary casing 30 surrounding the axle ends. Bolted to the plate 29 is a stationary hub 31 which surrounds the axle and extends for some distance, as shown, laterally of the plate 29. A taper roller bearing 32 is fitted between the axle and hub 31 to form a bearing for the axle. This bearing is held in position against the end of the spacer 28. The remote ends of the axle run in a pair of spaced taper roller bearings 33, upon which is rotatable the hub 34 of a bell-shaped member 35 extended in the direction of the body inside the casing 30 and closely adjacent thereto.

The said casing 30 is closed at its open end by a removable cover 36 which fits over the hub part 34, there being a dust and oil tight packing ring 37 interposed between the parts. An oil filler plug 38 is provided in the cover 36 and an opening 39 in the bell 35. The large driving sprocket wheels 17, heretofore described, are made fast to the hub 34 to rotate therewith, exteriorly of the stationary casings 30. A nut lock structure 40 and cap 41 completes the assembly. The other end of the axle 16 within the casing 30 adjacent the body is made oil tight by a spring pressed packing 42 covered by a removable cap 43.

Going back now to the stationary hub 31, it will be observed that a bearing sleeve 44 is slid thereon to provide a bearing for a rotatable hub 45 of a laterally projected planet gear carrier 46, which is held in place by a ring 47 detachably bolted to the outer end of said hub 31. As is conventional in planetary gearing, pins 48 are pinned fast in the carrier, said pins carrying loose planet gears 49 in mesh with the sun pinion 50 splined fast to the axle 16. A lock nut 51 holds the assembly in place. The usual outer plate to complete the planet carrier assembly appears at 52.

The rotatable part 35 includes an internal ring gear 53 with which the planet gears are in mesh. Obviously, now, when the planet carrier 46, 52 is locked against rotation, the bell part 35 and hub 34 will be driven, and, as the exteriorly located sprocket wheels 17 are made fast with the hubs 34, they too will be rotated to drive the tracklayer chains, which are trained around them. When both planet carriers are locked, both tracklayer chains are driven and the tractor is caused to move in a path straight ahead. When one is locked and the other unlocked, then turning movement for steering results. The steering control mechanism will accordingly next be described.

The hub 45 of the planet carrier includes a radial flange 54 to which is securely made fast a large worm gear 55. As shown in Figure 4, to which reference should now be made, the casing 30 at its lower front part is formed with a vertically disposed sleeve 56, closed by a bottom screw plug 57. This sleeve carries a bearing 58 on which is mounted a vertically extending shaft 59 having formed thereon a worm pinion 60 in mesh with the gear 55. The casing 30 at its upper front side embodies a neck extension 61 on which is carried the supporting flange or sleeve support 62 depending into the casing 30. A bracket 63 supports the lower end of the sleeve 62 and another thrust bearing 64 is also provided for the shaft 59, as shown. The upper end of the shaft 59 is splined, as shown, to receive a connecter 65, pinned and splined to a second shaft 66 removably mounted on and extending vertically, coaxially of the shaft 59. The shaft 66 is enclosed in a casing 67 bolted to the top of the casing extension 61.

The top of the casing 67 has bolted thereto a plate 68, in turn carrying bolted thereto a cover 69, to form a housing in the shape of a drum lying in a horizontal position. See also Figures 1 and 2. This housing encloses a conventional type of single dry plate clutch comprising a carrier 70 splined for sliding movement on top of the shaft 66, said carrier having made fast thereto the clutch plate 71 normally held in frictional engagement with the plate 68 by means of springs 72, only one of which is shown. Thus, the shaft 59 and worm 55 are normally locked to lock the planet carriers 46 to cause the tracklayer chains to be driven.

For steering control purposes the clutch plate 71 is released from holding position against the action of springs 72, by means of the usual levers 73, only one being shown, by means of the clutch release bearing 74 operated by the rockshaft 75 journaled in the cover 69. The shaft 75 is rocked by a hand lever 76 accessible from the seat 77 for the operator on the tractor. It will be understood that two clutches and two hand steering control levers are provided on opposite sides of the tractor, there being one for each tracklayer chain 18.

Figure 5:
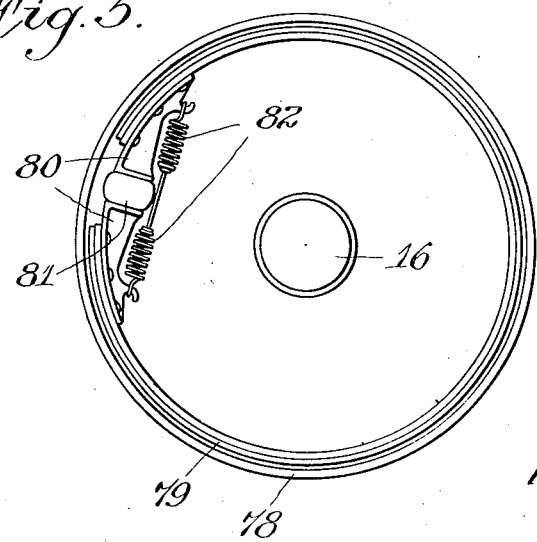
Figure 5 is a detail face view of one of the brakes.

Brakes are also provided for the tractor, as will now appear. In each casing 30, each member 35 includes a brake flange 78 adapted to be contacted frictionally by an internal, expanding brake band 79 (see Figures 3 and 5) supported in any well known manner. The band may be of the split type with adjacent ends carrying shoes 80, normally held together against a spreader cam 81, in contracted or non-braking position, by the usual springs 82. The cams 81 are formed on rockshafts 83 journaled in the casing 30 and having their inner ends rockable, and slid endwise into a bearing opening in the frame 10 of the tractor.

The structure for rocking the shafts 83 comprises the foot pedals 84 shown in Figures 6 and 7, there being one for each brake to enable independent operation of the brakes. As the pedals are close together, they may be operated easily together to use both brakes simultaneously. Each pedal operates links 85 which extend respectively to crank levers 86 and 87, the latter loose on a cross rockshaft 88, while the former is fast on the shaft to rock therewith. The crank 87 operates a link 89 connected by a crank 90 to rock the shaft 83. See Figure 7. Similarly, the crank 86 rocks the shaft 88 to rock a crank 91 which actuates a link, not shown, which is the counter-part of the link 89, to actuate a crank, not shown, but which is the counter-part of the crank 90, to rock the opposite shaft 83 of the other brake. Either brake may be applied to augment the steering action when the corresponding tracklayer drive has been released, or both brakes may be applied simultaneously to brake the tractor.

In operation, the main shaft 12 is driven from the prime mover through a conventional sliding gear transmission. This imparts rotation to the solid, continuous axle 16, causing the sun pinions 50 to turn. Normally, because of the springs 72, the control clutches 71 are operative to lock the vertical control shafts 59 to hold the planet carriers 46 locked, causing the members 35 and sprocket wheels 17 to turn through the internal gears 53 and planet gears 49. This drives the two tracklayer chains 18.

All of the transmission parts, except the sprockets 17, are enclosed in dirt proof casings 30, which contain lubricant. These casings are adapted to be opened by removal of the covers 36, enabling convenient inspection and replacement or adjustment of parts.

If it is desired to steer the tractor, one of the clutches 71 is released by hand pressure on one of the levers 76, which results in freeing the shafts 66, 59, worms 60, 55, to unlock the corresponding planet carrier 46, which effects a release of the associated drive to the particular sprocket wheel 17 and tracklayer chain 18, causing that chain to stop, while the opposite tracklayer continues to be driven. This effects turning movement of the tractor. The brakes 79 may be utilized to augment the steering action, if desired.

An important advantage results from this construction in that these control clutches are never under load or severe shock. The worm lock 55, 60 makes for a substantially shockless drive or release connecter to effect easy and gradual steering action. Further, due to the location of the clutches, it is possible to use dry plate clutches, and because of this location are easily accessible for adjustment and inspection, without interference with the other transmission parts.

The showing of Figure 3 also emphasizes and makes clear the easy, axial, orderly arrangement of drive parts for assembly or disassembly relative to the axle ends.

It will thus be seen that there is herein provided apparatus in which the several objects of the invention are achieved, and that the same is of simple construction, yet dependable in action, and is well adapted to meet the exacting conditions of hard practical use.

As various possible embodiments might be made of the above invention and as various changes might be made in the particular embodiment set forth, it is to be understood that all matter herein set forth or shown in the accompanying drawings is to be interpreted as illustrative, and not in a limiting sense.

What is claimed is:—

1. In a tractor, a frame, an axle passed therethrough, a casing secured on each side of the frame through which the axle ends pass, gearing in each casing driven by the axle, a rotatably mounted bell-shaped member formed with an internal gear operated by the gearing and having a hub formed as an integral extension of the bell member which is passed exteriorly of the casings and journaled on bearings carried by the axle ends, a driving sprocket wheel secured to each hub outside the casings, and tracklayer chains driven by said sprocket wheels.

2. In a tractor, a frame, an axle pass therethrough, a casing removably secured to each side of the frame through which the axle ends pass, planetary gearing including a ring gear driven by the axle and arranged in the casings, said ring gears formed on a rotatable bell-shaped member including a hub passed through the casings and formed as an integral extension of the member, which hub is carried on bearings surrounding the axle ends, a drive sprocket wheel secured to each hub outside the casings, and tracklayer chains driven by said sprocket wheels.

3. In a tractor, a frame, an axle passed therethrough, an open-sided casing bolted to each side of the frame, removable covers to close the casings, the axle ends passing through the casings and projected through and beyond the covers, planetary gearing including a ring gear driven by the axle and arranged in the casings, said ring gears carried on a rotatable bell-shaped member including an integrally formed hub passed through the casing covers to project laterally thereof and carried on bearings surrounding the axle ends, a sprocket wheel outside the casings on each said hub and secured thereto to turn therewith, and tracklayer chains driven by said sprocket wheels.

4. In a tractor, a frame, an axle passed therethrough, a stationary casing secured to each side of the frame with the axle ends passed therethrough, gearing in the casings driven from the axle, said gearing including a ring gear carried on a substantially bell-shaped member having a hub formed thereon which is passed exteriorly of the casings and carrying secured thereto a sprocket wheel outside the casings, tracklayer chains driven from the sprocket wheels, a flange in the casings formed as an extension of the bell-shaped member, and a brake in the casings cooperable with said flange.

5. In a tractor, a frame, an axle passed therethrough, a stationary casing secured to each side of the frame with the axle ends passed therethrough, planetary gearing in the casings driven from the axle, said gearing including a bell-shaped element comprising a ring gear and a brake flange inside the casings with a hub extended outside the casings, a sprocket wheel outside the casings on and rotatable with each hub, a brake in each casing, brake shafts rockably mounted in the casings and frame, and means for rocking the shafts to actuate the brakes.

6. In a tractor, a frame, an axle passed therethrough, a stationary casing secured to each side of the frame with the axle ends passed therethrough, a unitary bell-shaped element comprising a ring gear and a brake flange inside the casings and a hub extended outside the casings, bearings journaling the hubs on the axle ends, a sprocket wheel connected to rotate with each hub outside the casings, and a tracklayer chain driven by each sprocket wheel.

7. In a tractor, a frame, an axle passed therethrough, a stationary casing secured to each side of the frame with the axle ends passed therethrough, stationary hubs secured to the frame inside the casings, planet carriers journaled on said stationary hubs, planet gearing carried thereby, sun pinions on the axle ends to drive the planet gearing, ring gears in the casings driven from the planet gearing, said gears including hubs extended out of the casings and carrying sprocket wheels, tracklayer chains driven by said sprocket wheels, and means for locking and releasing the planet carriers.

8. In a tractor, a frame, an axle passed therethrough, a stationary casing secured to each side of the frame with the axle ends passed therethrough, stationary hubs secured to the frame inside the casings, planet carriers journaled on said stationary hubs, bearings for the axle in said stationary hubs, a removable plate to hold the bearings and planet carriers in place, planet gearing carried by the carriers and driven from the axle, ring gears driven by the gearing, said ring gears including hubs connected thereto and projected out of the casings, bearings on the axle ends for said hubs, sprocket wheels removably carried by the hubs outside the casings, tracklayer chains driven by the sprocket wheels, and means for locking and releasing the planet carriers.

9. In a tractor, a frame, an axle passed therethrough, an open-ended stationary casing removably secured to each side of the frame, a removable cover plate closing each casing with the axle ends passed through the casings and covers, stationary hubs removably secured to the frame inside the casings, planet carriers journaled on the hubs, means secured removably to the stationary hubs to hold the planet carriers in place, sun pinions on the axle ends in the casings, planetary gearing on the carriers in the casings driven from the sun pinions, unitary ring gears and hubs driven from the planetary gearing, said hubs projecting through the covers for the casings and removably carrying sprocket wheels exterior of the casings, tracklayer chains driven from the sprocket wheels, and means to lock and release the planet carriers.

10. In a tractor, a frame, an axle passed therethrough, a casing secured to the frame to surround the axle, planetary gearing including a planet carrier in the casing a tracklayer driven from the gearing, said casing having journaled therein a vertical shaft which projects through and above the casing, lock means connecting the shaft and carrier, a second shaft splined to the first and arranged coaxially therewith, a casing enclosing the second shaft, a drum on said second casing, a clutch therein for normally locking the two shafts and planet carrier, and means for throwing the clutch out to release the shafts and planet carrier.

11. In a tractor, a frame, an axle passed therethrough, casings secured to opposite sides of the frame with the axle ends passed therethrough, planetary gearing in the casings driven from the axle, sprocket wheels driven by the gearing, tracklayer chains driven by the sprocket wheels, planet carriers for the gearing in the casings, worm wheels connected with said carriers, vertical shafts journaled in the casings and extended outside thereof, said shafts including worm surfaces in mesh with the worm wheels, clutches normally locking the shafts to cause the planet carriers to be held against turning, and independent means individual to each clutch for throwing each clutch out optionally to regulate the steering of the tractor.

In testimony whereof I affix my signature.

EDWARD A. JOHNSTON.